July 24, 1956 D. B. PARKINSON 2,756,057

ADJUSTABLE TIME DEVICE FOR MAGNETIC RECORDER

Filed July 17, 1950 3 Sheets-Sheet 1

INVENTOR.
DAVID B. PARKINSON
BY Harry C. Page
ATTORNEY

ADJUSTABLE TIME DEVICE FOR MAGNETIC RECORDER

Filed July 17, 1950 3 Sheets-Sheet 2

INVENTOR.
DAVID B. PARKINSON
BY
[signature]
ATTORNEY

ADJUSTABLE TIME DEVICE FOR MAGNETIC RECORDER

Filed July 17, 1950 3 Sheets-Sheet 3

*INVENTOR.*
DAVID B. PARKINSON
*BY* Harry C. Page
ATTORNEY

United States Patent Office 2,756,057
Patented July 24, 1956

2,756,057

ADJUSTABLE TIME DEVICE FOR MAGNETIC RECORDER

David B. Parkinson, Cleveland Heights, Ohio, assignor, by mesne assignments, to Clevite Corporation, Cleveland, Ohio, a corporation of Ohio Application July 17, 1950, Serial No. 174,209

7 Claims. (Cl. 274—22)

Figures 1, 3:
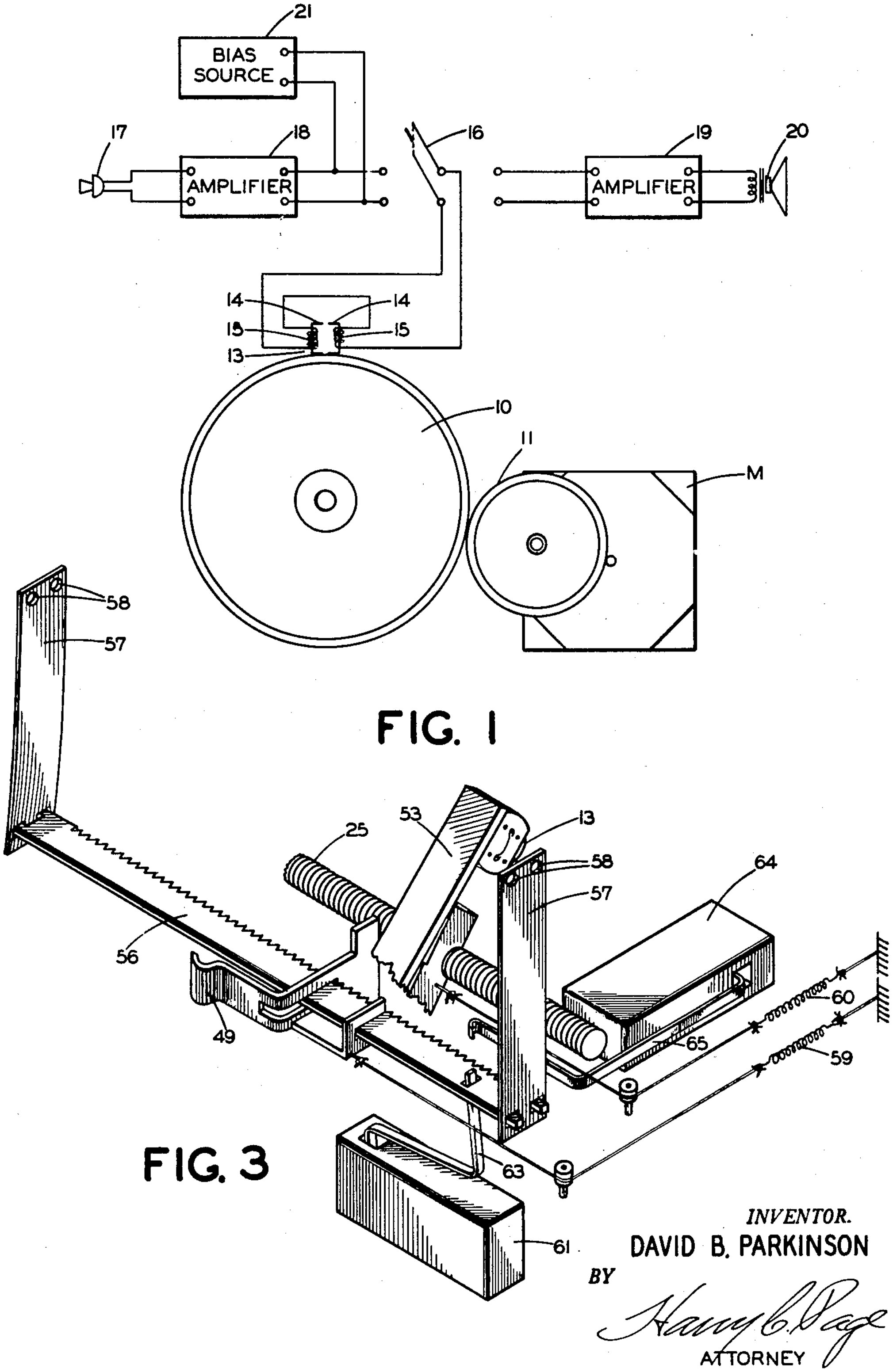

The present invention relates to a magnetic recording and reproducing device in which the time interval during which the machine runs during the recording process is adjustable and the reproduction interval is thus only so long as is required by the particular information which has been previously recorded on the machine.

Magnetic recording and reproducing devices have found many useful commercial applications. Such devices utilize a record medium which is magnetic and, in recording thereon, variations are effected in the remanent magnetization of the record medium, these variations corresponding to the information to be recorded. In reproducing such a magnetic record, the variations in remanent magnetism of the medium are utilized to generate electrical currents which are amplified and reproduced to provide the desired information. Record members for such devices have generally been in the form of a continuous tape or wire, in the form of a disk, or in the form of a loop, such as a drum. In the case of the disk or drum, a recording and reproducing head of the machine is caused to travel, by some guide or tracking means, over a predetermined path on the surface of the record member during recording and to repeat this travel over exactly the same path during reproduction. In all types of such record members, however, the time interval for a given machine is usually of a fixed value, regardless of the amount of information which is to be recorded on the record member.

It is frequently necessary to record information at one time, on a machine of the type under consideration, which may require a time interval which is radically different from that required at another time for a different set of recorded information. For example, if such a machine is used to supply weather information in response to telephone dialing, it may well be that the weather description will require a relatively large number of words on one day while on the following day only a few words are required. In reproducing information of the type under consideration, it is also very desirable that the machine shall start repeating the message again without delay after a given reproduction is completed. Otherwise, it is necessary for one taking the information from the record to wait in some cases for a considerable period before reproduction of the message can again be started in the case where only a short message is recorded on the machine and where the machine is capable of accepting a relatively long message. It is very desirable, therefore, to provide a magnetic recording and reproducing device which is not subject to the disadvantages mentioned above.

It is an object of the invention to provide an improved magnetic recording and reproducing device.

It is a further object of the invention to provide a magnetic recording and reproducing device from which the recorded message can be automatically obtained immediately after the end thereof in one reproducing step regardless of the length of the recorded message.

It is still an additional object of the invention to provide a machine from which the message can be easily reproduced immediately after the end thereof in one reproducing step regardless of the length of the recorded message and in which the fidelity of the reproduction of the machine is unchanged regardless of the time requirements imposed on the machine or the length of the message recorded thereon.

In accordance with the invention, a magnetic recording and reproducing device comprises recording and reproducing head means, a magnetic record member, and means for conditioning the recording and reproducing device for a recording operation and for providing relative motion between the head means and the record member to effect variations of remanent magnetism in the record member along a predetermined path and in accordance with information to be recorded. The device also comprises limit means, dependent upon the relative motion between the head means and the record member, and this limit means is adapted to be locked into any of the plurality of positions. Means are provided for stopping the motion between the head means and the record member to terminate the recording operation, and means dependent upon this stopping means are provided for locking the limit means in one of its positions corresponding to the length of path covered in the recording operation. The machine comprises means for conditioning it for a reproducing operation and for providing relative motion between the head means and the record member to provide an electrical signal in the head means which varies in accordance with variations of remanent magnetism along the record path. Means dependent upon the position of the above-mentioned limit means are provided for stopping the motion between the head means and the record member after only the portion of the record path which was covered in the recording operation is covered in the reproducing operation.

For a better understanding of the present invention, together with other and further objects thereof, reference is had to the following description taken in connection with the accompanying drawings and its scope will be pointed out in the appended claims.

Figure 2:
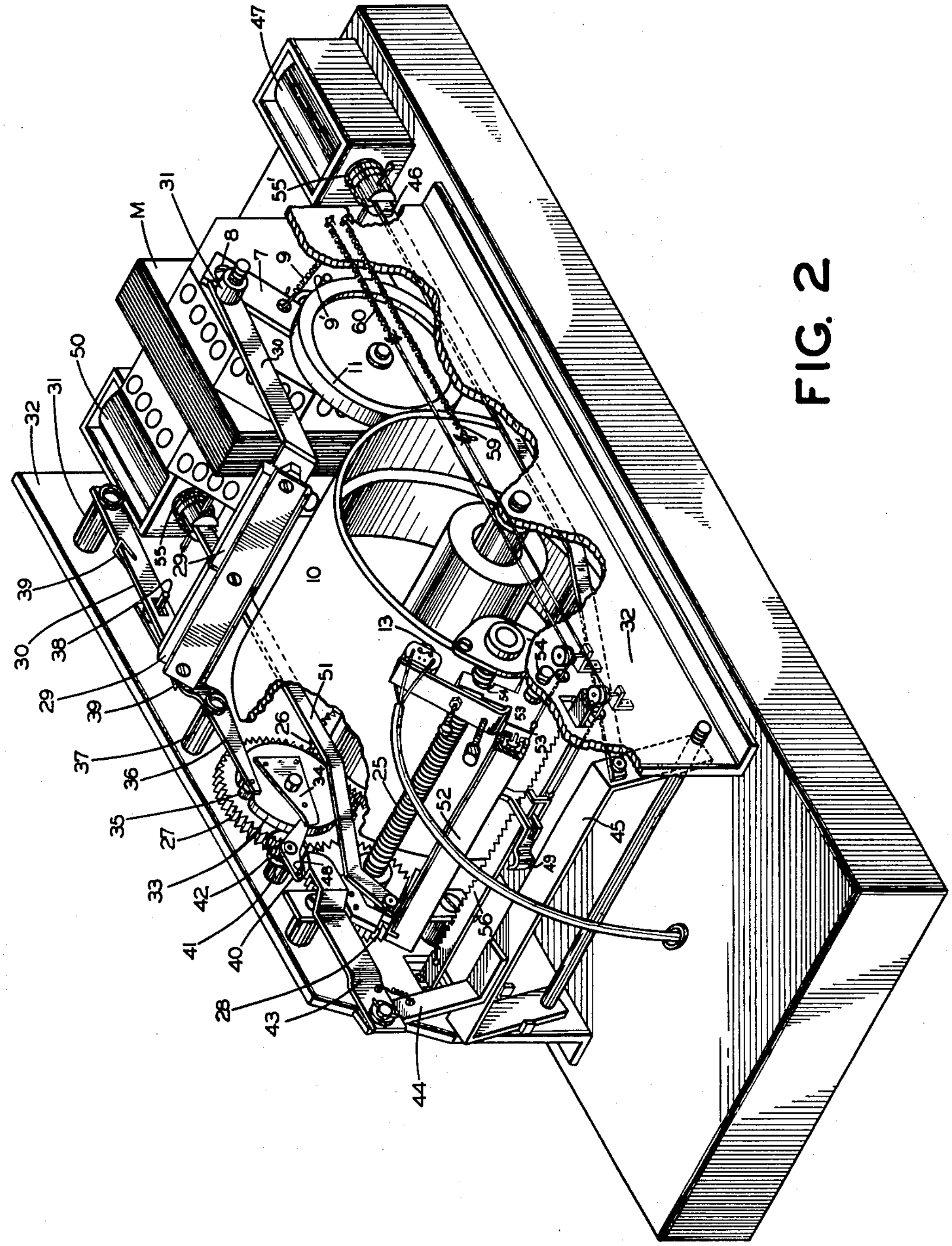
Figure 4:
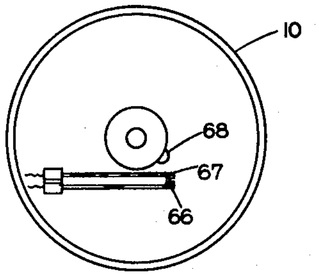
Figure 5:
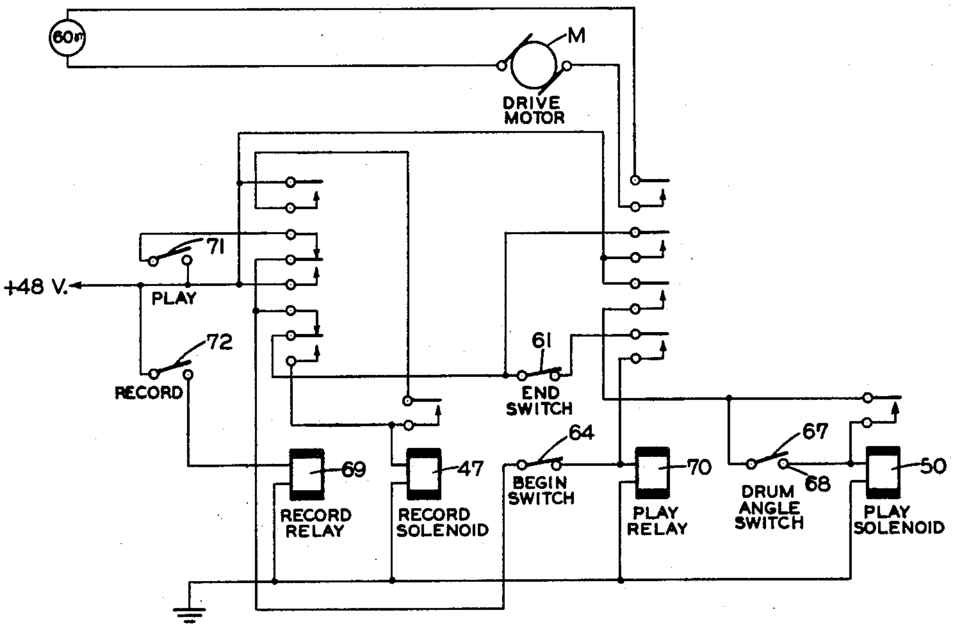

Referring now to the drawings, in Fig. 1 there is shown schematically a portion of a magnetic recording system which is utilized to illustrate the general principles involved in the magnetic recording process; Fig. 2 shows a magnetic recorded and reproducer in accordance with the invention, portions thereof being broken away to illustrate more clearly certain features of the machine; Figs. 3 and 4 illustrate certain specific features of the machine of Fig. 2; and Fig. 5 is a circuit diagram used in explaining the operation and control of the mechanical portion of the machine of Fig. 2.

Referring now more particularly to Fig. 1, the schematic arrangement there illustrated is provided primarily for illustrating the general principles of the drive system and the electrical circuits associated directly with the recording process. In Fig. 1, the reference numeral 10 designates a drum upon which magnetic recordings may be made. This drum may be of magnetic or non-magnetic metal but, if non-magnetic, the surface thereof should be provided with a magnetic coating. Alternatively, a sheet of paper or plastic having a magnetic coating thereon may be placed on the drum in order to receive the magnetic record. The drum 10 is driven by a motor M through a rubber wheel 11 which bears on the motor shaft at one point and against the surface of the drum 10 at another point.

A magnetic recording and reproducing head 13 is provided. This head is shown schematically as comprising two magnetic core members 14, 14, each having thereon a coil 15, 15, which coils are connected in series and to the center terminals of a double-pole, double-throw switch 16, In order to illustrate a source of signals to be recorded, a microphone 17 and its associated amplifier 18 are shown as being connected to one side of the double-pole, double-throw switch 16. In order to illustrate the reproducing function of the machine, an amplifier 19 and an associated loudspeaker 20 are shown as connected to the other set of switch terminals.

A bias source 21 is illustrated for supplying a suitable bias during the recording process. This bias source may be of direct current or may provide an alternating-current output having a frequency above the range of the signals to be recorded.

In considering the operation of the arrangement of Fig. 1, it will first be assumed that the switch 16 is closed to connect microphone 17 to the head 13. Under these conditions, and when the motor M is energized, the drum 10 is driven and sounds picked up by the microphone 17 cause variations in the remanent magnetization in the magnetic material of the drum 10 thereby leaving a record on the drum. In order to reproduce this record, the switch 16 is thrown to connect the loudspeaker 20 to the head 13 and, under these conditions, variations in the remanent magnetism of the drum 10 cause electrical currents to be induced in the windings 15—15 which are, in turn, amplified in amplifier 19 and reproduced by the loudspeaker 20.

Coming now to the illustration of Fig. 2 which shows a preferred embodiment of the erasing device of the invention, it will be first stated that the electrical components illustrated in Fig. 1 have been omitted from the showing of Fig. 2 for the sake of clarity. The magnetic recording device of Fig. 2 does, however, illustrate the recording head 13, the motor M, the drum 10 and the drive wheel 11. The drum 10 comprises a central casting having a hub effectively carrying several concentric cylinders which in turn carry a cylindrical sleeve upon which a plating of magnetic material is provided. The wheel 11 is carried by an arm 7, pivoted at pin 8 on the housing of the motor M and biased by a spring 9 so that the wheel 11 contacts the shaft 9′ of the motor M and the drum 10. A lead screw 25 is provided for traversing the head 13 across the drum 10. This lead screw is driven through a gear 26 on the shaft of drum 10 through the medium of an idler gear 27 and a gear 28 on the shaft of the lead screw 25. The rotatable record member is preferably provided by means of a plating of magnetic material on the drum 10 and this record member effectively has a plurality of record tracks which are successively traversed by the recording head 13 during successive revolutions of the drum 10. Specifically, the head 13 travels in a spiral path along the drum surface when the motor M is energized.

The machine illustrated in Fig. 2 comprises a means for erasing all of this plurality of record tracks during a single rotation of the record member or drum 10. The erasing device illustrated is described and claimed in an application for United States Letters Patent Serial No. 174,172, now U. S. Patent No. 2,589,035, filed concurrently herewith in the names of Semi Joseph Begun and Theodore F. Deucher for Automatic Erase for Magnetic Recorder and assigned to the same assignee as the present invention. For the purpose of erasing the record member, permanent magnets 29, 29 are provided. These permanent magnets are mounted on arms 30, 30 which are pivoted around pins 31, 31. The side plate in the foreground of the illustration is shown as having been broken away in order to show more clearly certain details of the machine, but it will be understood that each of the two pins 31, 31 are held by the two side plates of the machine, only one of which is fully illustrated. As illustrated in the drawing, the magnets 29, 29 are spaced from the drum 10 and no erasing is effected during this position of the magnets. For the purpose of moving the magnets 29, 29 into contact with the drum 10, a cam 33 is provided which is adapted to be pressed into contact with the gear 27 through the medium of a spring 34 which is carried by the cam 33. It may be preferable to provide a pin on spring 34 which is adapted to fit into an indentation in gear 27 through a hole in cam 34 in order to provide a positive lock between cam 33 and gear 27. As illustrated, the cam 33 is provided with a slot containing a roller 35 and the construction is such that, when the cam 33 is driven, the roller 35 actuates an arm 36 which is pivoted about a pin 37 and which, in turn, moves one of the arms 30 through the medium of a pin 38. A spring 39 is provided for causing the roller 35 to follow the contour of the cam 33. Rotation of the cam 33, therefore, causes the roller 35 to be driven out of the depression in cam 33 thereby raising the roller and lowering the magnets 29, 29 against the surface of the drum 10.

In the operation of the machine it is essential that the magnets 29, 29 be lowered against the drum 10 only during certain conditions of operation and, for the purpose of causing the cam 33 to be ineffective to operate the magnets 29, 29 during these certain conditions of operation, a latching device is provided for holding the spring 34 and the cam 33 away from gear 27. This latching device comprises a bellcrank 40 which is pivoted upon a pin 41 and which is biased counter-clockwise by means of a spring 42. One end of the bellcrank 40 is adapted to be driven between the spring 34 and the cam 33, when the motor M operates, in such a manner that the pressure of the spring 34 is relieved so that cam 33 ceases to rotate. During certain conditions of operation, however, it is necessary to release the spring 34 and this is done by means of a solenoid-operated lever system which includes the levers 43, 44, 45, 46 and a record solenoid 47. Energization of the solenoid 47 thus causes the lever 43 to raise a pin 48 on one end of the bellcrank 40 and rotate the bellcrank clockwise. This removes the bellcrank 40 from contact with the spring 34. The lever 43, however, is provided with an inclined surface upon which the pin 48 bears and the contour is such that, when solenoid 47 is energized, the pin 48 is driven up this inclined surface to release the spring 34 and thereafter the pin 48 drops off the inclined surface, again allowing the bellcrank 40 to be biased in a counter-clockwise direction by means of the spring 42. Thus, when the latch provided by the bellcrank 40 and the spring 34 is released by the lever 43, the cam 33 is pressed into contact with gear 27 and rotates with gear 27 for a complete revolution of the drum 10, but at the end of this revolution, one end of bellcrank 40 enters a space between the spring 34 and the cam 33 and effectively relieves the pressure between the cam 33 and the gear 27. This mechanism is provided to cause the machine to erase only during one revolution of the drum 10.

The machine illustrated also comprises the feature of a stopping device which is effective to cause the machine to operate during a reproducing operation only over the portion of the drum 10 upon which a recording has previously been made. This stopping feature is provided by a latching arrangement including a member 49 which is positioned at the proper point during a recording process in a manner which will be described in detail hereinafter. The head 13 is normally removed from the drum 10, but when a recording is to be made, the head 13 is moved against the drum 10 by means of a record solenoid 50 and levers 51 and 52. The head 13 is moved by an arm 53 which is pivoted on a rod 54 which runs between the two side plates 32, 32 of the machine and the arm 53 is effectively provided with a half-nut portion 54 adapted, when in operation, to contact the lead screw 25 and drive the arm 53 axially of the drum 10. A pin 53′, held by the arm 53 engages a channel portion of lever 52 in such a manner that the head 13 is moved into contact with the drum 10 when the lever 52 is moved in a clockwise direction around the rod 54. Operation of the solenoid 50 which, in turn, moves the levers 51 and 52 causes the arm 53 to be rotated to move the head 13 against the drum 10. A spring 55, associated with solenoid 50, normally keeps the head 13 removed from the drum 10 when the solenoid 50 is not energized. A similar spring 55' is is provided for solenoid 47. A portion of the arm 53, as is clearly illustrated in Fig. 3, is adapted to move the latch 49 over to its required position as a recording is being made. The lever 45 presses against the arcuate portion of latch 49 when the record solenoid 47 is energized to move the latch 49 so that it readily can be pushed by the arm 53. The latch 49 is generally similar to the margin stops which are used on commercial typewriters and operates along a saw-tooth bar 56 which is suspended from the side plates 32, 32 of the machine by means of springs 57, 57 (see Fig. 3), pins or screws 58, 58 being utilized to mount the springs 57, 57 on the side plates 32, 32 of the machine. When the lever 45 is rotated counter-clockwise as seen in Fig. 2, a spring 59 causes the latch 49 to be locked into one of the serrations of the bar 56 effectively making the latch 49 immovable. A spring 60 is provided for returning the arm 53 and the record head 13 to the starting position under certain conditions of operation which are described in detail hereinafter.

In order to provide certain additional control features, several switches are incorporated in the machine of Fig. 2. Thus, there is provided a normally closed "end" switch which is designated in Fig. 3 by the reference numeral 61 but which has been omitted from the showing of Fig. 2 for the sake of clarity. The switch 61 has an arm 63 which is adapted to be driven by the serrated strip 56 when it is moved against the action of springs 57, 57. In operation, the serrated strip 56 is moved when contacted by arm 53 in certain conditions of operation, described hereinafter, when the arm 53 is being driven by lead screw 25. Also a "begin" switch is illustrated in Fig. 3 by the reference numeral 64. Here again a showing of this switch has been omitted from Fig. 2 for the sake of clarity. The switch 64 is operated by a lever 65 under certain conditions of operation, described hereinafter, when the lever 65 is contacted by the arm 53 under the influence of spring 60. This condition of operation can only occur, of course, when the arm 53 is not in contact with and being driven by the lead screw 25. Another switch which is not shown in the Fig. 2 arrangement because it is inconvenient to do so therein is illustrated by the showing of Fig. 4. This switch may be termed the "drum-angle" switch and comprises normally open contacts 66 and 67 which are adapted to be closed by a projection 68 on the hub portion of drum 10, the purpose of this switch being to provide a circuit for causing the energization of the record solenoid 50 at a predetermined instant such that the head 13 always travels the same spiral path over the drum 10. Additionally, the device of Fig. 2 includes a multi-contact relay 69 (not shown) termed the "record" relay and a multi-contact relay 70 (not shown) termed the "play" relay.

In order to describe the sequence and method of operation of the various elements which have so far been described, reference is now made to Fig. 5 wherein there is shown a schematic electrical diagram of the machine which omits the electrical features directly associated with the recording process which are illustrated in Fig. 1. Thus in Fig. 5 the solenoid 50 is illustrated as having a pair of normally open contacts which are in shunt with the drum-angle switch contacts 67—68. The play relay 70 is adapted to be energized through the normally closed contacts of the begin switch 64, a set of normally closed contacts on the record relay 69 and a "play" switch 71. The motor M is shown in Fig. 5 as being connected to a 60-cycle power source through a set of normally open contacts on the play relay 70. A "record" switch 72 is also provided for energizing record relay 69 and initiating the recording operation of the machine. The begin switch 64, which is shown in Fig. 3, is also illustrated in Fig. 5 and the remaining connections and relay and solenoid contacts are as illustrated in Fig. 5.

In considering the operation of the machine which has just been described it is desirable to consider the entire cycle in several steps. First let it be assumed that a recording is to be made on the machine. In order to make this recording the operator closes the record switch 72 which causes the record relay 69 to be energized directly from the 48-volt power source illustrated. The energization of the record relay 69 in turn energizes the play relay 70 through the begin switch 64 and a set of normally-open contacts upon the record relay 69. When the play relay 70 is thus energized, the motor M is connected to the 60-cycle power source through a set of normally open contacts on the play relay 70. The play solenoid 50 is also energized through the drum-angle switch 67, 68 and a set of normally open contacts on the play relay 70. However, the play solenoid 50 can only be energized at a particular instant during the rotation of drum 10 when the drum-angle switch 67, 68 (see Fig. 4) is closed. This insures that the head 13 will always be placed in the same spiral track on drum 10. However, once the drum-angle switch 67, 68 has been closed to energize play solenoid 50, this solenoid closes its set of normally open contacts effectively to short out the drum-angle switch 67, 68 maintaining the play solenoid energized even though drum-angle switch 67, 68 opens immediately thereafter due to the rotation of the drum 10. The record solenoid 47 is also energized through sets of normally open contacts on record relay 69 and play relay 70 so that, during the recording operation, record relay 69, play relay 70, record solenoid 47 and play solenoid 50 are all energized. Under this condition of the machine, the motor drives drum 10 which, in turn, rotates gear 27. The energization of solenoid 47 causes the bellcrank 40 to be rotated clockwise through the action of the levers 46, 45, 44, and 43, thus releasing spring 34 and causing the spring 34 to press the cam 33 against the gear 27. The cam 33 is thus driven by the gear 27 and the roller 35, following the surface of cam 33, causes the permanent magnets 29, 29 to be pressed against the surface of the drum 10. This condition endures for one complete revolution of the drum 10 after which the bellcrank 40 again engages spring 34 and releases the tension of cam 33 against the gear 27, thereby stopping the cam 33 with the pin 35 in the depression on the cam surface and causing the permanent magnets 29, 29 to stop in their position remote from the drum 10. The energization of the play solenoid 50 causes the head 13 to be moved against the surface of the drum 10 through the action of the lever system 51, 52, and 53 and also causes the half-nut 54 on the arm 53 to engage the lead screw 25. Head 13 thus commences to follow a spiral path along the drum surface as soon as the solenoid 50 is energized. During this interval a recording can be made by speaking into the microphone 17 illustrated in Fig. 1 when the switch 16 is so thrown as to connect the microphone 17 to the head 13 through the amplifier 18. Due to the fact that the lever 45 presses against the arcuate portion of latch 49, the latch 49 is free to slide along the serrated bar 56 and is moved therealong by its contact with the arm 53 as is most clearly illustrated in Fig. 3.

The conditions just described endure until a recording has been made. When the recording is finished however, the record switch 72 is opened which de-energizes all of the relays and solenoids. The de-energization of solenoid 47 causes the lever 45 to release its pressure on the arcuate part of the latching device 49 tightly locking this device in one of the teeth of the serrated lever 56. The de-energization of solenoid 50 causes the half-nut 54 to be removed from its contact with the lead screw 25 and the spring 60 is effective to pull the head 13 back to its starting position bacause of the fact that the lever 53 is slidable on the rod 54.

Therefore, as the operation of the machine has so far been described, a recording has been made upon the drum 10 and the latching device 49 has been set at a position which corresponds to the length of the recording which has been made.

It is next in order to consider the operation of the machine during a reproducing operation. When it is desired to reproduce the record which has been made on the drum 10, the play switch 71 is closed which energizes the play relay 70 through the begin switch 64 and a set of normally closed contacts on the record relay 69. The begin switch 64 is only closed when the head 13 is in the starting position but the relay 70, when energized through the begin switch 64, remains energized through a normally open set of contacts on play relay 70, the end switch 61 and two pairs of normally closed contacts on the record relay 69. The play solenoid 50 is next energized through the drum-angle switch 67—68 and a set of normally open contacts of the play relay 70. Due to the normally open set of contacts on play solenoid 50, which effectively short circuit drum-angle switch 67, 68, the play solenoid 50 again remains energized after the drum-angle switch is driven beyond its closed position. As thus described the head 13 is in contact with the drum 10, having been placed there on exactly the same track which was used in the recording process, and the lead screw 25 drives the head 13 along the desired path on drum 10.

Referring back to Fig. 1 and considering the switch 16 to be closed in the position connecting loudspeaker 20 to the record head 13 through amplifier 19, it will thus be seen that, under the conditions just described, the machine functions to reproduce the recording which was previously made. However, when the machine reaches the end of the recording, the lever 53 pushes against a portion of the stop device 49 as clearly illustrated in Fig. 3 due to the fact that the lever 53 is being driven by the lead screw 25. Since the latch 49 is in its locked position, this pressure against it causes a movement of the serrated bar 56 against the action of the springs 57, 57, thereby moving the lever 63 and operating the end switch 61.

It will be seen by reference to Fig. 5 that, when the end-switch 61 is open, the locking circuit of the play relay 70 is broken to de-energize the relay. This causes both the play relay 70 and the play solenoid 50 to be de-energized and the spring 60 again pulls the head 13 back to its starting position. If now the play switch 71 still remains closed, the reproducing cycle will be repeated.

The magnetic recording and reproducing device just described is thus seen to include a recording and reproducing head means 13 and a magnetic record member which comprises the plating on the drum 10. The switch 72 (Fig. 5) and the motor M and its controls are included in a means for conditioning the device for a recording operation and for providing relative motion between the head means 13 and the record member on drum 10 for effecting variations of permanent magnetism in the record member along a predetermined path determined by the travel of the head 13 on the drum 10 under the control of the lead screw 25 and in accordance with information to be recorded. The latch 49 is included in a limit means which is dependent upon the relative motion between head 13 and drum 10 and is adapted to be locked in any of the plurality of the positions defined by the serrations in bar 56. The switch 71 (Fig. 5), and the motor M are included in a means for conditioning the device for a reproducing operation and for providing relative motion between the head means 13 and the record member comprising the plating on drum 10 to provide an electrical signal in the head means which varies in accordance with the variations of the remanent magnetism along the record path. The latching means 49, which is moved by the bar 53 at the end of the record in reproducing, thereby causing the serrated bar 56 to be moved against the action of the springs 57 and operate end switch 61, is included in a means which is dependent upon the latched position of the latch 49 of the limit means for stopping the relative motion between the head 13 and the drum 10 after only the portion of the record path which was covered in the recording operation is covered in the reproducing operation.

It is next in order to consider the restoration of the machine for a new recording. The erasing operation has previously been described. Briefly, it includes the energization of solenoid 47 which actuates levers 46, 45, 44, and 43 to cause movement of the cam 33. The cam 33 causes the permanent magnets 29—29 to erase the surface of the drum 10. When the lever 45 is moved by solenoid 47 during the erasing operation it engages the latch 49, as shown in Fig. 2, causing the forward end of the latch 49 to move away from the serrations in the bar 56 thereby unlocking the latch 49 from the bar 56 and permitting the spring 59 to pull the entire latch mechanism 49 back to its initial position. A subsequent recording operation will cause the latch mechanism 49 to move down the bar 56 to a new limit position.

The machine which has just been described was designed primarily for use in connection with complicated installations of switching equipment in order to effect certain accounting or ticket-selling operations. In one installation, the machine has been used for recording the available space in pullmans. The installation is such that any ticket seller can contact the particular machine upon which the information he desires is recorded and listen to the recording thereon in order to determine what space is available on a particular train. This system is also such that, when a ticket is sold, the recording can be easily changed by a simple operation so that the same ticket agent or any other ticket agent interested in space on the same train thereafter will instantly receive the desired information. It is contemplated that a large number of the machines of the present invention will be utilized in the installation under consideration and that ticket agents at various remote points will have the necessary information and controls available for their purposes. It is also contemplated that the machine just described will be used in various inventory and accounting systems, wherein each particular machine is used to record some particular item or bit of information and wherein any desired machine can be contacted for the purpose of listening to its record or changing the record thereon by any desired number of authorized personnel.

While there has been described what is at present considered to be the preferred embodiment of the invention, it will be obvious to those skilled in the art that various changes and modifications may be made therein without departing from the invention and it is, therefore, aimed to cover all such modifications and changes as fall within the true spirit and scope of the invention.

What is claimed is:

1. A magnetic recording and reproducing device comprising: recording and reproducing head means; a magnetic record member; means for conditioning said device for a recording operation and for providing relative motion between said head means and said record member for effecting variations of remanent magnetism in said record member along a predetermined path and in accordance with information to be recorded; a limit means dependent upon said relative motion and adapted to be locked in any of a plurality of positions; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation; and means for automatically restoring said limit means to its initial position when a succeeding recording is to be made on said record member.

2. A magnetic recording and reproducing device comprising: recording and reproducing head means; a magnetic record member; means for conditioning said device for a recording operation and for providing relative motion between said head means and said record member for effecting variations of remanent magnetism in said record member along a predetermined path and in accordance with information to be recorded; a limit means dependent upon said relative motion and adapted to be locked in any of a plurality of positions; means for stopping said relative motion between said head means and said record member to terminate said recording operation and for restoring the original relative position between said head means and said record member; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation; and means for automatically restoring said limit means to its initial position when a succeeding recording is to be made on said record member.

3. A magnetic recording and reproducing device comprising: recording and reproducing head means; a magnetic record member; means for conditioning said device for a recording operation and for providing relative motion between said head means and said record member for effecting variations of remanent magnetism in said record member along a predetermined path and in accordance with information to be recorded; a limit means dependent upon said relative motion and adapted to be locked in any of a plurality of positions; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation and for reconditioning said device for another reproduction of the same recorded material; and means for automatically restoring said limit means to its initial position when a succeeding recording is to be made on said record member.

4. A magnetic recording and reproducing device comprising: recording and reproducing head means; means for conditioning said device for a recording operation and for providing relative motion between said head means and said record member for effecting variations of remanent magnetism in said record member along a predetermined path and in accordance with information to be recorded; a mechanical limit means dependent upon said relative motion and adapted to be locked in any of a plurality of positions; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation; and means for automatically restoring said limit means to its initial position when a succeeding recording is to be made on said record member.

5. A magnetic recording and reproducing device comprising: recording and reproducing head means; a looplike record member; means for conditioning said device for a recording operation and for rotating said record member while moving said head means along the surface thereof in a spiral path for effecting variations of remanent magnetism in said record member along a predetermined path in accordance with the information to be recorded; a limit means adapted to be moved in accordance with the motion of said head means and adapted to be locked in any of a plurality of positions; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation; and means for automatically restoring said limit means to its initial position when a succeeding recording is to be made on said record member.

6. A magnetic recording and reproducing device comprising: recording and reproducing head means; a looplike record member; means for conditioning said device for a recording operation and for rotating said record member while moving said head means along the surface thereof in a spiral path for effecting variations of remanent magnetism in said record member along a predetermined path in accordance with the information to be recorded; a limit means comprising a serrated bar and a member having a motion along said serrated bar which is dependent upon said movement of said head means and which is adapted to be locked in any one of the serrations of said bar; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means dependent upon the locked position of said limit means for stopping said relative motion after only the portion of said predetermined path which was covered in said recording operation is covered in said reproducing operation; and means for automatically restoring said limit means to its initial position when a succeeding recording is to be made on said record member.

7. A magnetic recording and reproducing device comprising: recording and reproducing head means; a loop-like record member; means for conditioning said device for a recording operation and for rotating said loop-like record member while moving said head means along the surface thereof in a spiral path for effecting variations of remanent magnetism in said record member along a predetermined path in accordance with the information to be recorded; a limit means comprising a serrated bar and a member having a motion along said serrated bar which is dependent upon said movement of said head means and which is adapted to be locked in any one of the serrations of said bar; means for stopping said relative motion between said head means and said record member to terminate said recording operation; means dependent upon said stopping means for locking said limit means in one of said positions corresponding to the length of said predetermined path covered in said recording operation; means for conditioning said device for a reproducing operation including automatically returning said recording and reproducing head means to the beginning of said predetermined path and for providing relative motion between said head means and said record member to provide an electrical signal in said head means varying in accordance with said variations of remanent magnetization along said predetermined path; means for causing said head means to contact said limit means in its locked position to stop said relative motion after only the portion of said predetermined path which was covered in said recording operation is covered in said reproducing operation; and means for automatically restoring said limit means to its initial position when a succeeding recording is to be made on said record member.

References Cited in the file of this patent

UNITED STATES PATENTS

| | | |
|---|---|---|
| 858,184 | Holm | June 25, 1907 |
| 2,259,745 | Franz | Oct. 21, 1941 |
| 2,277,207 | Chenoweth et al. | Mar. 24, 1942 |
| 2,280,575 | Fritzinger | Apr. 21, 1942 |
| 2,530,029 | Pond | Nov. 14, 1950 |